United States Patent
Burton

[15] 3,648,447
[45] Mar. 14, 1972

[54] FRUIT HARVESTING MACHINE FOR LOW PLANTS

[72] Inventor: Charles G. Burton, Lewiston, N.Y.

[73] Assignee: Chisholm-Ryder Company, Inc., Niagara Falls, N.Y.

[22] Filed: Apr. 13, 1970

[21] Appl. No.: 27,858

[52] U.S. Cl. ............................................. 56/330, 171/92
[51] Int. Cl. ........................................................ A01d 45/22
[58] Field of Search ............... 56/128, 129, 136, 330; 171/14, 171/15, 53, 17, 25, 92, 142

[56] References Cited

UNITED STATES PATENTS

| | | | |
|---|---|---|---|
| 1,193,189 | 8/1916 | Richter | 171/92 |
| 2,220,398 | 11/1940 | Dreikosen | 171/92 |
| 2,267,879 | 12/1941 | Tillitt | 171/92 |
| 3,473,613 | 10/1969 | Boyce | 171/14 |
| 3,130,791 | 4/1964 | Schmidt | 171/53 |
| 2,426,545 | 8/1947 | Young | 171/42 |
| 3,252,520 | 5/1966 | Hill et al. | 171/14 |

*Primary Examiner*—Antonio F. Guida
*Attorney*—Sommer, Weber & Gastel

[57] ABSTRACT

A machine for harvesting fruit on relatively low plants such as wild lowbush blueberries including a vehicle mounting a horizontally disposed reel at the front thereof with its axis oriented transversely to the direction of vehicle travel, the reel mounting articulating tines which move toward and away from the reel during the process of picking the blueberries from the bushes and dumping the blueberries into the inside of the reel, the reel being floatingly mounted by means of a spring arrangement to cause it to yield with minimum damage when it encounters obstructions, a first conveyor within the reel in effective communication with a second conveyor outside of the reel which receives berries from the first conveyor and carries the blueberries rearwardly along the sides of the machine to a dumping station where the berries are dumped into a container, the second conveyor being so located that the berries therein are not subject to abrasion from plants through which the machine passes, the second conveyor including an inner solid conveyor which carries the berries and an outer open conveyor which permits the berries to fall through but retains the debris, thereby separating the debris from the berries in an efficient manner, the machine also including a rear steering mechanism for providing sharp steering in the field.

12 Claims, 16 Drawing Figures

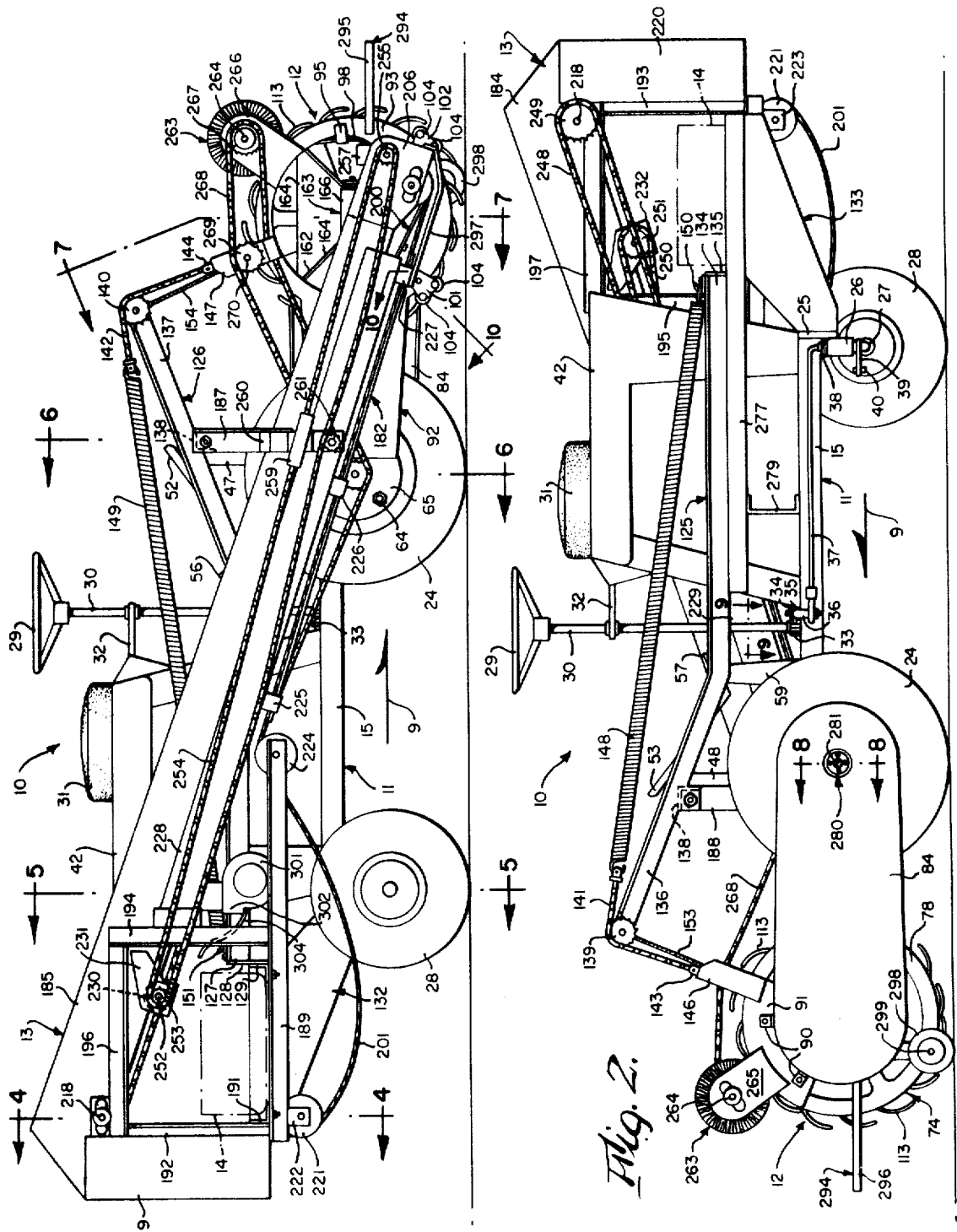

INVENTOR.
Charles G. Burton

INVENTOR.
Charles G. Burton
BY
Sommer, Weber & Gastel
ATTORNEYS

INVENTOR.
Charles G. Burton
BY
Sommer, Weber & Gastel
ATTORNEYS

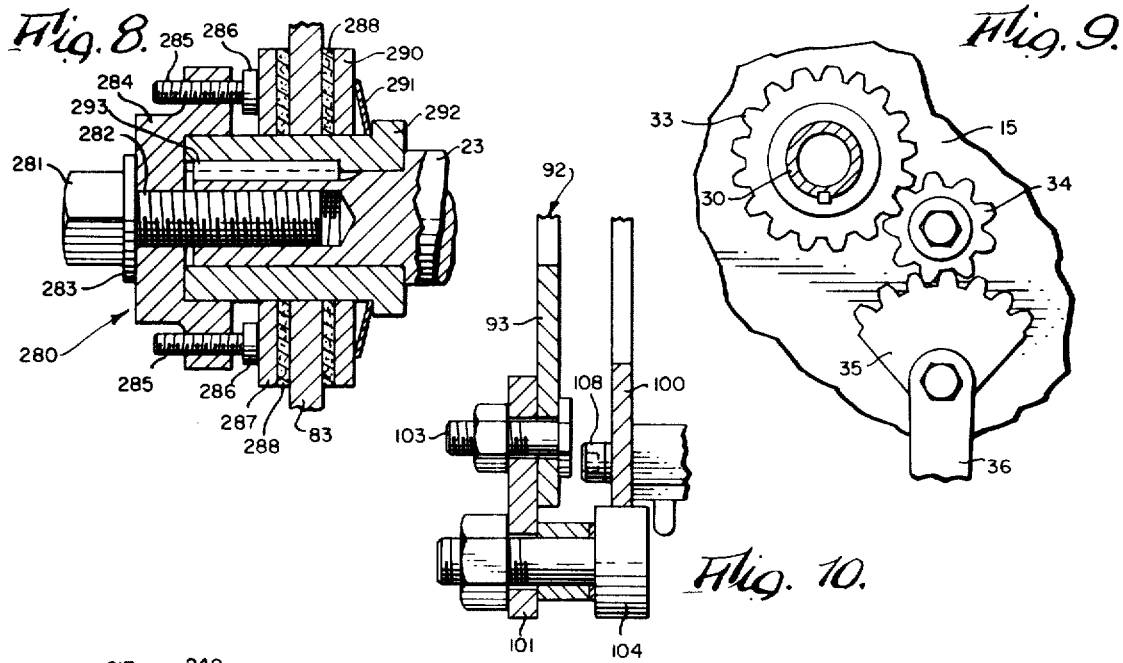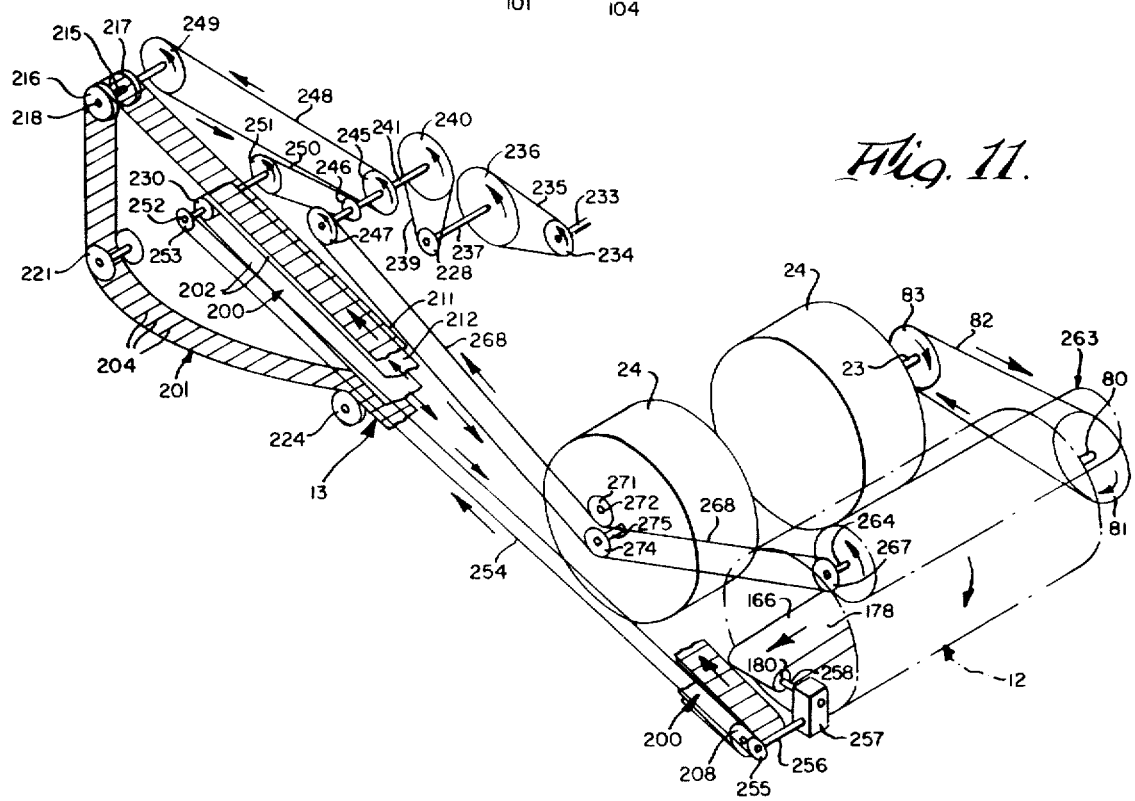

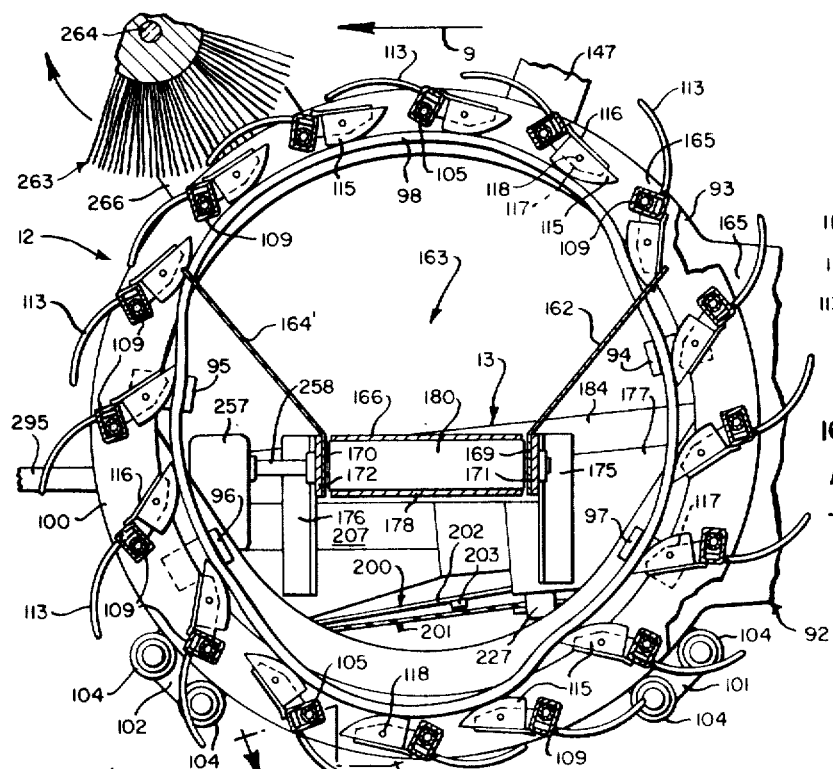
Fig. 12.
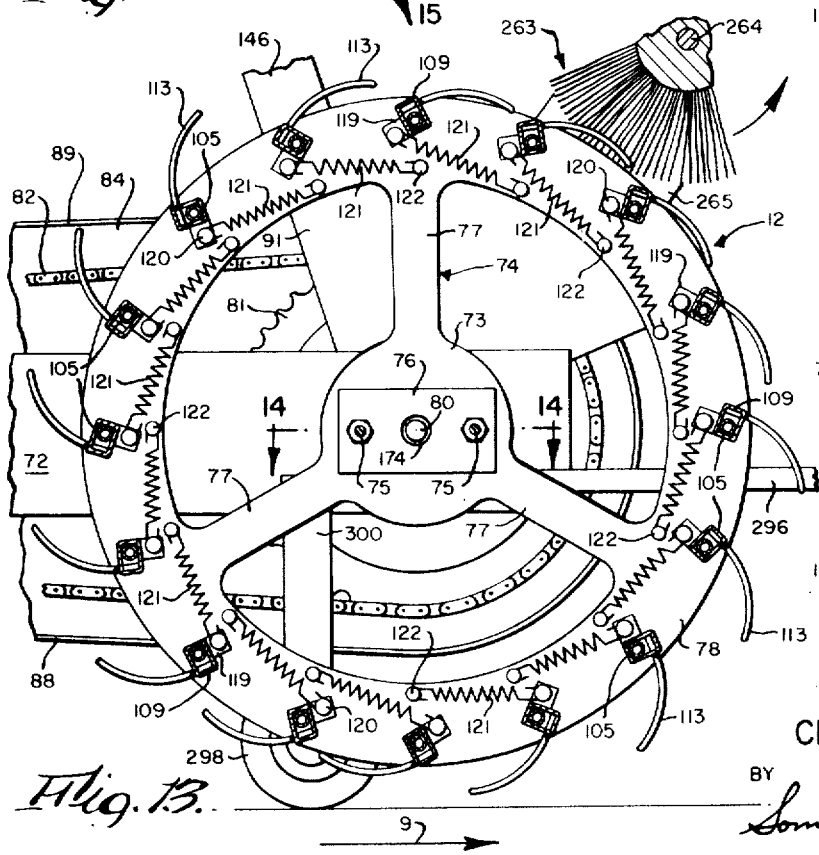
Fig. 13.
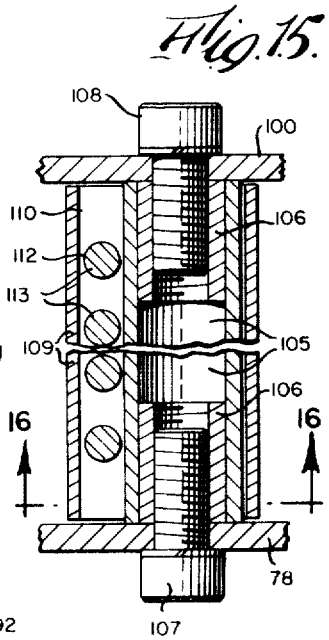
Fig. 15.
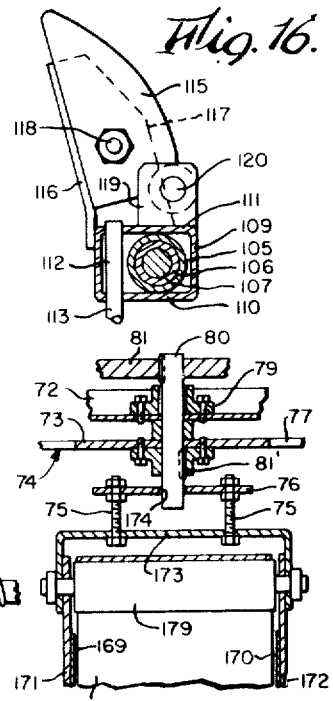
Fig. 16.
Fig. 14.
INVENTOR
Charles G. Burton
BY
Sommer, Weber & Gastel
ATTORNEYS

3,648,447

FRUIT HARVESTING MACHINE FOR LOW PLANTS

The present invention relates to an improved machine for harvesting fruit on relatively low plants and more particularly to a machine for harvesting wild lowbush blueberries which normally grow on rocky and uneven terrain. The present invention is an improvement over a machine of the type disclosed in the copending application of Gleason L. Gray et al., Ser. No. 865,448 filed Oct. 10, 1969.

It is the primary object of the present invention to provide an improved harvesting machine for wild lowbush blueberries which will harvest an extremely high acreage of berries per unit of time in a highly efficient manner. A related object of the present invention is to provide an improved harvesting machine which will provide an extremely high-picking efficiency because of the use of a reel mounting articulating fingers, which results in less berry loss during the picking of the berries from the bushes. Another related object of the present invention is to provide an improved harvesting machine in which there is very little damage to the berries while passing through the machine because abrasion of the berries is avoided. A further related object of the present invention is to provide an improved harvesting machine in which the aforementioned tines are cleaned in a highly efficient manner, thereby contributing to the aforementioned highly efficient harvesting. Still another related object of the present invention which leads to improved efficiency is the use of a floating reel which mounts the articulating tines, the floating action permitting the reel to yield and adjust itself to the various loadings to which it is subjected. Still a further related object of the present invention which results in increased harvesting efficiency is the incorporation into the machine of an unique conveyor system which inherently separates the berries from other debris such as stalks, leaves and the like in a highly efficient manner, thereby obviating the attendant labor which is otherwise required to effect this separation. Another related object is to provide an improved harvesting machine of the foregoing type which has an extremely sharp steering capacity thereby causing it to have increased mobility which results in less time required to negotiate around obstructions which are normally encountered in crops of this type. Yet another object of the present invention is to provide an unique reel driving arrangement for the machine which permits the reel to be deactivated when the machine is being driven to and from the harvesting site. Other objects and attendant advantages of the present invention will readily be perceived hereafter.

The present invention relates to an improved machine for harvesting wild lowbush blueberries, or the like, and comprises a vehicle which is movable over the berry bushes and mounts on its front end a reel having its axis oriented horizontally and transversely to the direction of vehicle travel. The reel mounts axially extending rows of cantilevered tines which are circumferentially spaced about the periphery of the reel, the tines of each of the rows being spaced from each other a distance which is less than the minimum dimension of the berries. An articulating arrangement, which in this instance includes a cam located proximate the reel and a plurality of cam followers, causes the tines to articulate in such a manner so as to provide maximum harvesting efficiency. Broadly, the outer ends of the tines are caused to move toward and away from the reel between more closed and more opened positions, respectively. The tines are caused to move to a more open position when they penetrate the blueberry bushes in advance of the path of vehicle travel so that the tines can penetrate such bushes with a minimum of disturbance to the leaves and stalks, thereby to avoid excessive dropping of the fruit. Thereafter, the tines are caused to move to a more closed position as they move under the lowermost portion of the reel so as to prevent berries therein from dropping and for causing the tines to be in a relatively retracted position at the bottom of the reel to minimize damage thereto from rocks and the like. Thereafter, as the tines move upwardly during rotation of the reel, they are caused to progressively open to retain the berries and thus prevent premature depositing of the berries into the reel. They will maintain a relatively open position until such time as they are caused to tend to close when the tines approach the top of the travel of the reel so as to dump the berries into the inner portion of the reel through spaces therein. The foregoing series of broadly described articulating actions are repeated cyclically with each rotation of the reel. Associated with the articulating fingers is a cleaning brush which extends the length of the reel in substantially parallel relationship thereto. This cleaning brush operates on the tines when they are in the relatively closed position and this provides maximum cleaning efficiency which in turn results in increased picking efficiency. The reel is floatingly mounted on the machine so that it may float over small obstructions which it may encounter on the uncultivated field while suffering attendant minimum damage because of such yielding. Berries which are dumped within the reel are carried out of one end of the reel by a first conveyor which dumps them onto a second conveyor which conveys them toward the rear of the vehicle. The berries are conveyed in such a manner that they are not subjected to abrasion and bruising which they would experience in the event that the conveyor was located at the front of the machine where the picked berries could contact the plants in advance of the machine. The machine includes a rear wheel drive which provides sharp steering which is required to avoid larger obstructions in the field and which is desired to provide sharper turns which result in increased acreage yield per unit of time. The second conveyor comprises a double conveyor arrangement which separates the berries from associated debris such as plants, stalks, leaves and the like in a highly efficient manner, thereby obviating the necessity to perform such tasks at a subsequent time. The various aspects of the present invention will be more fully understood when the following portions of the specification are read in conjunction with the accompanying drawings wherein:

FIG. 1 is an elevational view of the right side of the machine;

FIG. 2 is an elevational view of the left side of the machine;

FIG. 8 is a fragmentary cross-sectional view taken substantially along line 8—8 of FIG. 2 and showing the clutch arrangement for driving the reel;

FIG. 9 is a fragmentary view taken in the direction of line 9—9 of FIG. 2 and showing a portion of the steering linkage;

FIG. 10 is a fragmentary cross-sectional view taken substantially along line 10—10 of FIG. 1 and showing a detail of the rollers for supporting the right side of the reel;

FIG. 11 is a schematic view of the power train for various portions of the machine;

FIG. 12 is a view, partially in cross section, taken along line 12—12 of FIG. 7 and partly showing the manner in which the articulating tines are mounted relative to the remainder of the reel structure;

FIG. 13 is a view, partially in cross section, taken substantially along line 13—13 of FIG. 7 and showing the opposite end of the reel structure from the end shown in FIG. 12;

FIG. 14 is a view, partially in cross section, taken substantially along line 14—14 of FIG. 13 and showing the reel driving structure and the structure for supporting the end of the conveyor within the reel;

FIG. 15 is a view partially in cross section taken substantially along line 15—15 of FIG. 12 and showing the manner in which the tines are mounted on their supporting bars; and FIG. 16 is a view partially in cross section taken substantially along line 16—16 of FIG. 15 and showing the manner in which the cam follower is attached to the tine-supporting bar.

Figure 3:
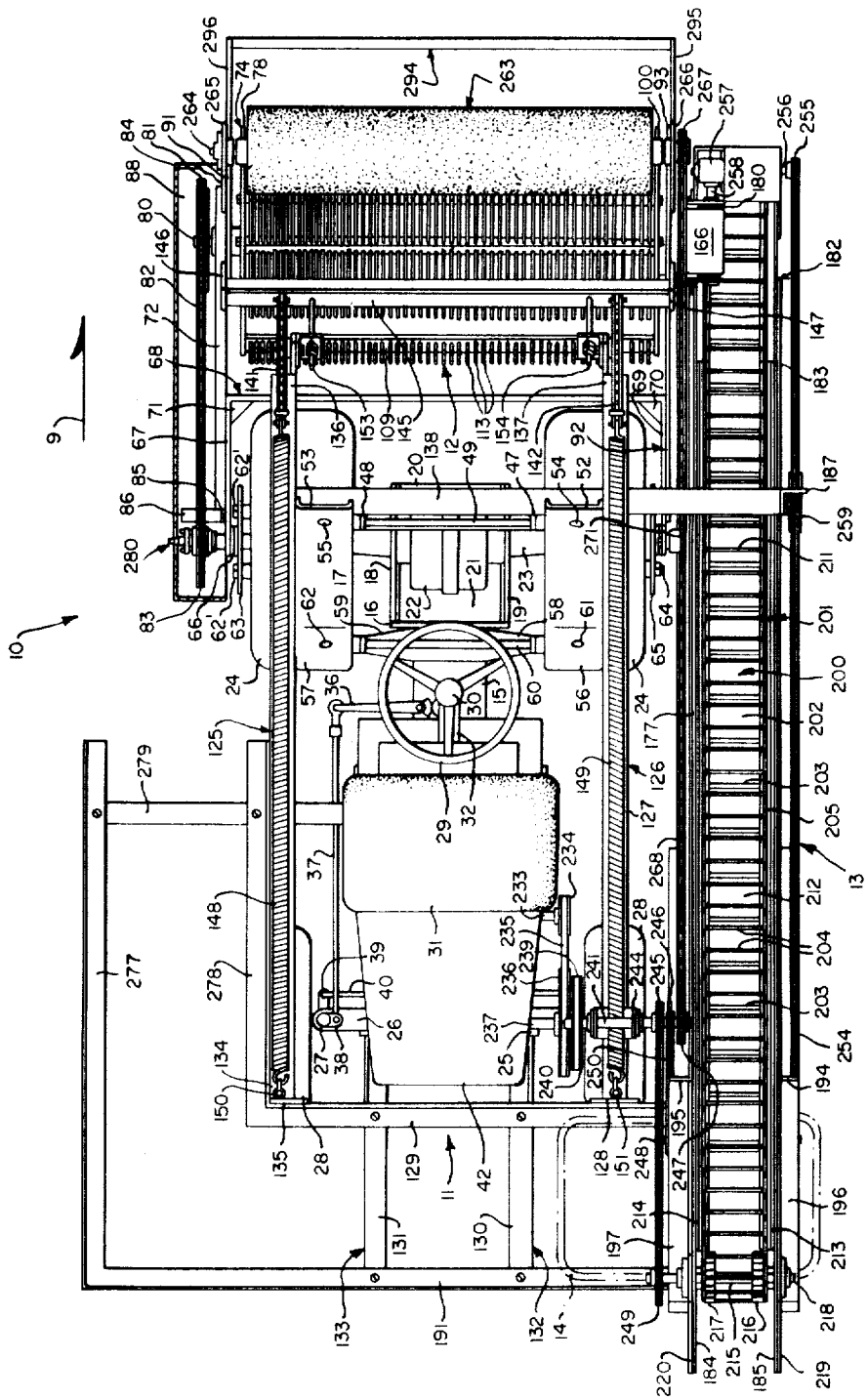
FIG. 3 is a top plan view of the machine.

The improved harvesting machine 10 of the present invention broadly includes a vehicle 11 mounting a blueberry gathering reel 12 at its front end and a conveyor assembly 13 on its right side for conveying blueberries gathered by reel 12 into containers 14 mounted at the rear portion of the vehicle. The normal forward direction of vehicle travel is indicated by arrow 9. While the following portion of the specification will refer to the present machine as one for harvesting blueberries, and was developed especially for wild lowbush blueberries, it will be appreciated that it is suitable for harvesting other crops which lend themselves to this type of harvesting, such as strawberries or pickles.

The vehicle 11 includes a main frame channel 15 (FIGS. 1, 2, 3, and 5) having a plate 16 (FIGS. 3 and 6) welded thereto, plate 16 in turn forming a wall of housing 17 which includes side plates 18 and 19, front plate 20, and bottom plate 21. Housing 17 supports the opposite sides of differential housing 22 having axle 23 extending from opposite sides thereof which in turn rotatably supports front wheels 24 having tires thereon. The opposite or rear end of main frame channel 15 is welded to plate 25 (FIGS. 3 and 5) which in turn is welded to rear axle 26, as are the lower ends of the downwardly extending legs of channel 15 at their juncture with axle 26. Rotatably mounted on kingpins 27—27' are rear wheels 28 having tires thereon.

A steering mechanism causes kingpins 27—27' to pivot for steering the vehicle by means of turning the rear wheels, and this rear wheel steering provides great maneuverability. The steering mechanism includes a steering wheel 29 mounted on steering column 30 which is supported in a vertical position relative to vehicle seat 31 by means of brace 32. The lower end of steering column 30 mounts gear 33 (FIG. 9) which is in mesh with idler gear 34 mounted on a stub shaft on frame member 15. Idler gear 34 in turn is in mesh with sector gear 35 which is also pivotally mounted on frame member 15. Sector gear 35 is fixed to one end of lever 36 which has its other end pivotally coupled to one end of link 37 (FIG. 3) which has its opposite end pivotally coupled to lever 38 (FIGS. 3 and 5) which is keyed to kingpin 27. An arm 39 extends outwardly from a lower portion of kingpin 27 and pivotally receives one end of tie rod 40, the other end of which is pivotally received in lever 41 (FIG. 5) which is keyed to kingpin 27', to complete the steering linkage assembly. A suitable engine is mounted within engine housing 42, the engine (not shown) having an output shaft 233 (FIG. 3) which drives the various conveyors associated with the machine, as described in greater detail hereafter. A drive shaft (not shown) extends from the engine into differential housing 17 and has an operative drive with axle 23 for driving the front wheels 24. The exact structure for effecting this is being omitted in the interest of brevity inasmuch as it is well known.

The vehicle frame also includes foot supports for the vehicle operator. In this respect struts 47 and 48 (FIG. 6) have their lower ends bolted to housing 17 by means of bolts 49' and 50', respectively. The upper ends of struts 47 and 48 receive rod 49 which has outer ends 50 and 51 attached to plates 52 and 53, respectively, by bolts 54 and 55, respectively (FIG. 3). Heel-rests 56 and 57 are formed integrally with plates 52 and 53, respectively, and in turn are supported by struts 58 and 59, respectively, which have their lower ends bolted to channel frame member 15 and their upper ends spacedly attached to rod 60 which is secured underneath heel rests 56 and 57 by means of bolts 61 and 62 (FIG. 3).

Figure 6:
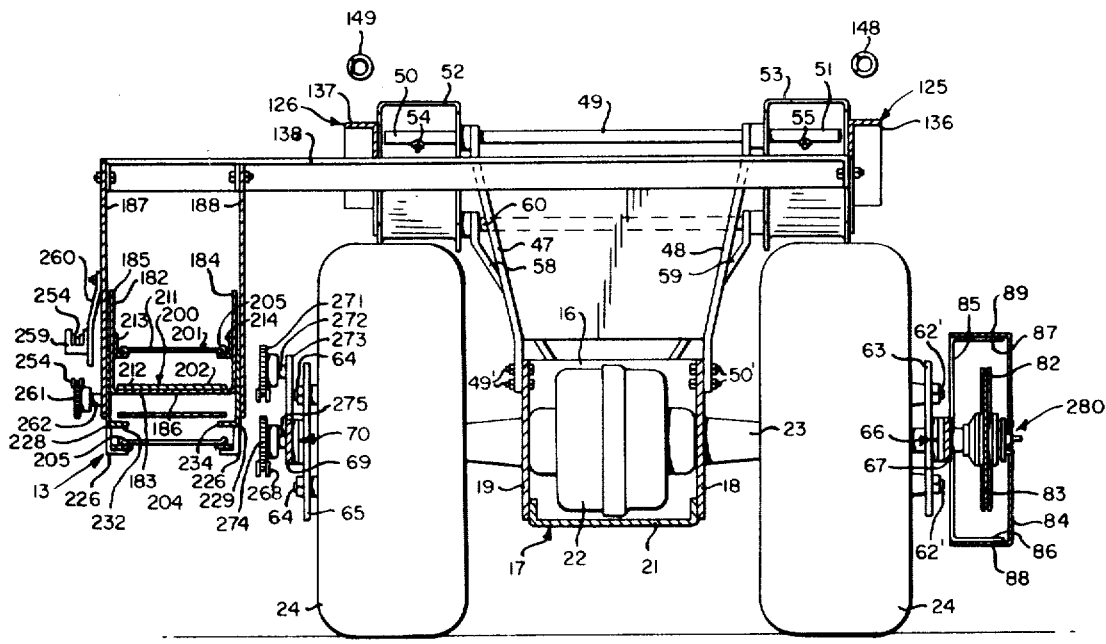
FIG. 6 is a fragmentary cross-sectional view taken along line 6—6 of FIG. 1 with certain parts omitted in the interest of clarity.

The reel 12 is floatingly suspended on the front of the vehicle in advance of front wheels 24. In this respect the wheel driving bolts 62' mount a plate 63 (FIG. 3). The wheel driving bolts 64 on the right wheel 24 mount a circular plate 65 (FIGS. 1 and 3). Plate 63, on the left side of the vehicle, mounts a bearing assembly 66 (FIGS. 3 and 6) having a movable portion which rotates with plate 63 and a stationary portion on which arm 67 of U-frame member 68 is secured, leg 69 of member 68 being attached to the stationary portion of bearing 70 which has an associated portion mounted on plate 65 for rotation with the latter (FIGS. 3 and 6). Gussets 70' and 71 rigidize U-frame member 68. A horizontal channel member 72 (FIGS. 3 and 7) has one end rigidly affixed, as by welding, to arm 67 and the other end (FIG. 13) rotatably mounts the central portion 73 of spider 74. Spider 74 includes radial spokes 77 which terminate at outer ring 78. Channel 72 carries a bearing 79 (FIG. 14) which journals shaft 80 which is keyed to spider 74 by means of key arrangement 81'. Shaft 80 has sprocket 81 keyed to the outer end thereof (FIGS. 3, 13 and 14), sprocket 81 mounting chain 82 which also encircles sprocket 83 (FIGS. 3 and 6) on the outer end of axle 23. A housing 84 encloses the foregoing drive, the housing being supported on U-shaped bracket 85 (FIGS. 3 and 6) having its vertical central portion suitably secured to arm 67 and its lower and upper horizontal portions 86 and 87, respectively, secured to the lower and upper horizontal portions 88 and 89 of housing 84. The front of housing 84 has L-shaped brackets 90 secured thereto (FIGS. 2 and 7), the vertical legs of these brackets being in turn attached to sector 91 which is suitably supported from the frame of the machine, as will be described in greater detail hereafter. It can readily be seen therefore that the driving of chain 82 will drive spider 74 which in turn will drive reel 12. Thus the rate of rotation of reel 12 varies directly with the speed of travel of the vehicle, it being appreciated that the ratio of such speeds is calculated for optimum picking efficiency.

The opposite end of reel 12 on the right side of the machine is mounted in the following manner. A plate 92 includes a solid portion at the left when viewed in FIG. 1 which is welded to arm 69 (FIG. 3) of U-frame member 68. The portion of member 92 at the right forms a generally circular ring 93 (FIGS. 1 and 12). A plurality of L-shaped straps 94, 95, 96 and 97 (FIG. 12) have first portions secured as by welding to ring 93 and second portions secured by welding to cam track 98. Ring 93 is suitably supported from the frame of the machine as will be described in greater detail hereafter. The rotatable portion of reel 12 includes the above mentioned spider 74 at the left side of the machine and a rotatable ring 100 at the right side of the machine. Brackets 101 and 102 (FIGS. 1, 10 and 12) have their upper portions secured to ring 93 by bolts 103 and their lower portions mounting rollers 104 which rotatably support rotatable ring 100.

Extending axially of reel 12 between outer portion 78 of spider 74 and ring 100 are circumferentially spaced hollow rods 105 (FIGS. 12 and 15) having plugs 106 at the ends thereof which receive screws 107 extending through spider 74 and screws 108 extending through ring 100. Loosely mounted on each hollow rod 105 and extending substantially the entire length of each rod 105 is a hollow rectangular tube 109. Each tube 109 has spaced sets of aligned apertures in the opposite sides 110 and 111 thereof which receive the ends 112 (FIG. 12) of tines 113. A number of tines 113 are spaced in parallel relationship along the length of each tube 109 with the spacing between adjacent tines being less than the diameter of the berries to be picked by the machine. As can be seen from FIGS. 1, 2 and 3, the tines 113 are circumferentially oriented in parallel rows on the reel 12.

As noted briefly above, the tines 113 articulate to provide highly efficient harvesting. To this end, the end of each tube 109 proximate cam track 98 includes a cam follower 115 (FIG. 12) secured thereto by means of bracket 116 (FIG. 16) which has one end welded to tube 109 and a portion 117 which mounts bolt 118 which secures the cam follower 115 thereto. The ends of rectangular tubes 109 proximate spider 74 have tabs 119 (FIG. 13) secured thereto be welding. Pins 120 extend outwardly from tabs 119 and mount first ends of springs 121, the other ends of which are attached to pins 122 which are fixed to spider 74. Springs 121 tend to bias tubes 109 and tines 113 carried thereby in a counterclockwise direction in FIG. 13 about the axis of tubes 105. As the reel rotates in a counterclockwise direction in FIG. 12, starting at top dead center, the cam followers 115 will cause the tines 113 to assume a relatively closed position during the first portion of their travel for effecting most efficient cleaning by brush 263, as will be described in greater detail hereafter. By way of reference, arrows 9 in all the Figures indicate the normal forward direction of vehicle travel. Thereafter, as can be seen from FIG. 12, the tines will gradually assume a more open position so as to penetrate the plants in advance of the reel in a manner which causes minimum disruption of the stalks and leaves. As the reel continues its rotation a raking action will occur on the plants to separate the berries from the bushes. Thereafter, as the tines approach bottom dead center they will gradually move to a more closed position for the purpose of retaining the picked berries therein and also to avoid injury to the tines by preventing contact with rocks on the ground. As the tines move upwardly from bottom dead center, the will tend to open more, as shown, to prevent the berries held therein from prematurely being dumped into the reel. Thereafter, the tines will tend to move to a more closed position to cause the berries which are held in crotch 165 to be dumped through the spaces on the reel between tubes 109. Thereafter, the tines will tend to continue their movement to a more closed position until they reach top dead center, whereupon the above-described cycle of articulation is repeated. FIGS. 12 and 13 show the relative positions of the tines during their travel. By means of the foregoing articulation, the most efficient harvesting is achieved with a minimum possibility of injury to the reel.

Figure 4:
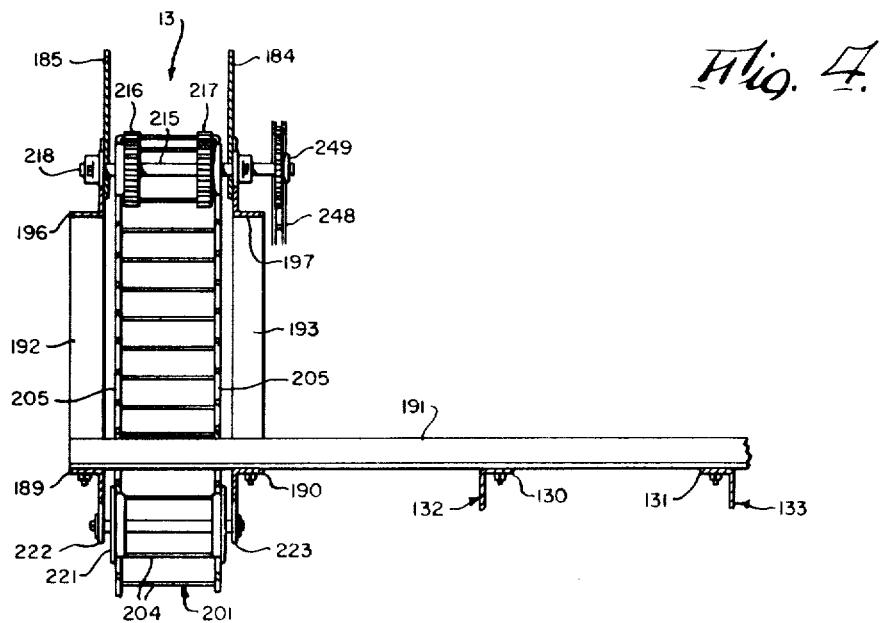
FIG. 4 is a fragmentary cross-sectional view taken along line 4—4 of FIG. 1 with certain parts omitted in the interest of clarity.

As noted briefly previously, reel 12 is capable of floating to accommodate itself to unevenness of the terrain. Therefore, reel 12 is pivotable about the axis of axle 23. It is to be noted, however, that structure is provided to maintain the elevation of reel 12 at a predetermined set value when it is not floating. This structure includes spaced beams 125 and 126 (FIG. 3). Beam 126 includes a rear horizontal portion 127 welded to upstanding plate 128 (FIGS. 1 and 5) which in turn is welded to angle 129 which is bolted to horizontal portions 130 and 131 (FIG. 4) formed at the top of gussetlike plate 132 and 133, respectively (FIGS. 1, 2 and 4) which have their lower vertical ends welded to cross plate 25 (FIG. 2) which is welded to the end of inverted main frame channel 15 (FIG. 5), as discussed above. Beam 125 also includes a rear portion 134 (FIG. 2), which is analogous to portion 127 of beam 126, and the end of portion 134 is welded to upstanding plate 135 (FIG. 5) which in turn is welded to angle 129. Beams 125 and 126 include upwardly inclined forward portions 136 and 137, respectively, (FIGS. 1, 2, 3 and 6). An angle cross brace 138 (FIG. 6) has central portions thereof welded to upstanding struts 47 and 48. This brace 138 is welded to the vertical leg of angle-shaped beams 125 and 126, as can be seen from FIGS. 1, 2 and 6. It is in this manner that the upwardly inclined portions 137 and 136 of the beams are supported.

Figure 7:
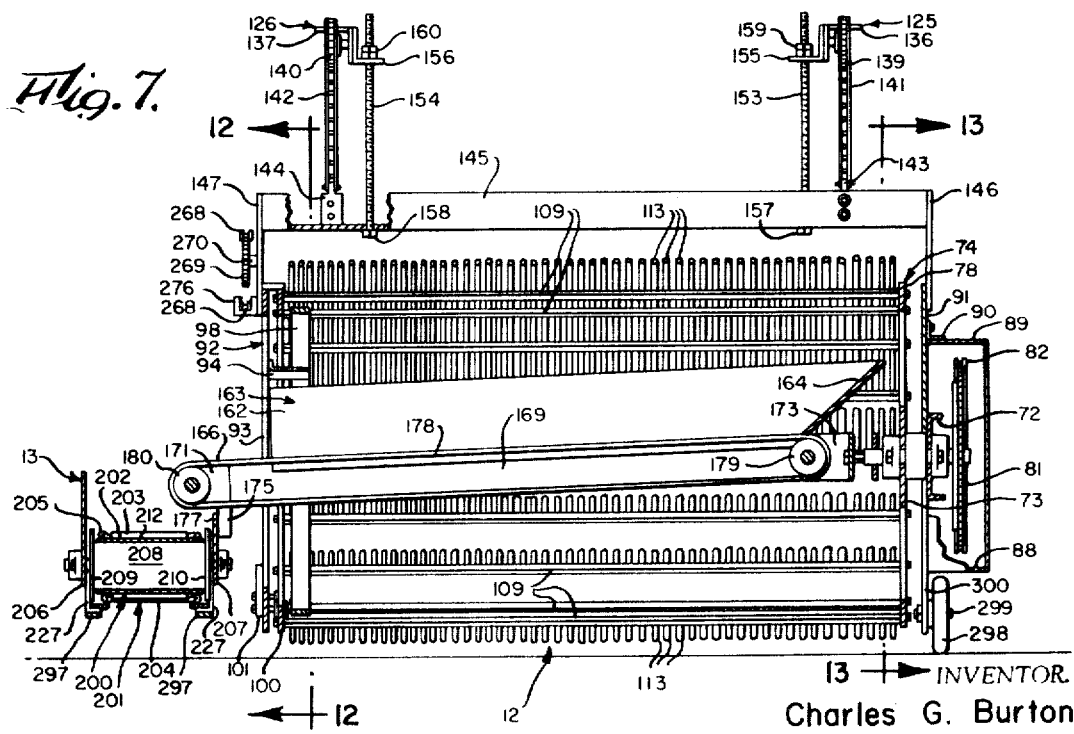
FIG. 7 is a fragmentary cross-sectional view taken along line 7—7 of FIG. 1 with certain parts omitted in the interest of clarity.

The forward uppermost ends of beams 125 and 126 rotatably mount sprockets 139 and 140, respectively. Chains 141 and 142 are mounted on sprockets 139 and 140, respectively, and the lower ends of these chains are secured to brackets 143 and 144, respectively, which are bolted to cross bar 145 (FIGS. 1, 2 and 7). The ends of angle 145 mount plates 146 and 147. The lower portion of plate 146 is welded at its lower end to sector 91 (FIGS. 2 and 13). The lower end of plate 147 is welded to ring portion 93 of member 92 (FIGS. 1 and 12). The opposite ends of chains 141 and 142 are connected to elongated spring 148 and 149, respectively, the opposite ends of which are connected to hooks 150 and 151, respectively, mounted on the rear portions 134 and 127, respectively, of beams 125 and 126, respectively. It can readily be appreciated that as the reel is subjected to different loads and shocks during operation the springs 148 and 149 will yield to permit the reel 12 to float.

The limit of downward travel of reel 12 is determined by the adjustment of tie screws 153 and 154 (FIGS. 1, 2, 3 and 7). The upper ends of screws 153 and 154 extend through angles 155 and 156, respectively, which are welded to the vertical legs of beams 126 and 125, respectively, (FIG. 7). The lower ends of screws 153 and 154 extend through the horizontal leg of cross brace 145 and include heads 157 and 158, respectively, on which cross brace 145 is supported. By adjusting the nuts 159 and 160 on screws 153 and 154, respectively, the elevation of beam 145 and of the reel 12 supported thereby can be adjusted for different types of terrain. For example, if the terrain is extremely rocky, it would be desired to have reel 12 at a higher elevation. On smooth terrain it could be adjusted to a lower level. It will be appreciated, however, that the reel can float upwardly as it is subjected to shocks.

As noted previously, the rotation of the reel 12 with the accompanying articulation of the tines 113 will result in the harvesting of berries from the plants. These berries are carried by the tines in a counterclockwise direction in FIG. 12 after they have been separated from the plants. They will not fall out from the spaces between the tines because as noted above the spacing between the tines is less than the diameter of the berries. The tines will travel upwardly carrying the berries in a counterclockwise direction in FIG. 12 until such time as they pass side 162 of trough 163 which extends substantially the entire axial length of the reel (FIG. 7). The end of trough 163 also includes an end plate 164 (FIG. 7) and a sidewall 164' (FIGS. 1 and 7) which is symmetrical to sidewall 162. As the tines 113 pivot in a counterclockwise direction (FIG. 12) while they pass the top of sidewall 162, the berries which are held in the vertex or crotch 165 between the tines and tube 109, FIG. 12, will roll out of the crotch and be dumped downwardly by gravity and will thereafter fall between the rectangular tubular members 109 and into trough 163 which in turn guides the berries onto conveyor 166 which carries the berries out through the opening in the ring 93 on the right side of the machine.

Trough plates 162 and 164' have lower vertical portions 169 and 170, respectively, FIG. 12, which are secured as by welding, to elongated plates 171 and 172, respectively, (FIGS. 7, 12 and 14). The innermost end of plates 171 and 172 are attached by welding to U-shaped bracket 173 (FIGS. 14 and 7), having bolts 75 attached to the central portion thereof, said bolts 75 in turn being mounted on plate 76 (FIGS. 13 and 14), the central portion of which includes an enlarged aperture 174 which receives the end of shaft 80 loosely so as to permit plate 76 to wobble and adjust itself as required. Plate 76 will not fall off of the end of shaft 80 because the opposite end of the conveyor frame is rigidly mounted relative to the vehicle. In this respect the ends of plates 171 and 172 which are located at the right side of the vehicle are secured, as by welding, to angles 175 and 176, respectively (FIGS. 7 and 12), which in turn are secured as by welding to plate 177 which forms a part of a conveyor which receives the berries from conveyor 166, as will be described in greater detail hereafter. Conveyor 166 is of the endless belt type and includes a belt 178 which extends around rollers 179 (FIG. 14) and 180 (FIG. 12), these rollers being journaled in plates 171 and 172 in spaced relationship.

Figure 5:
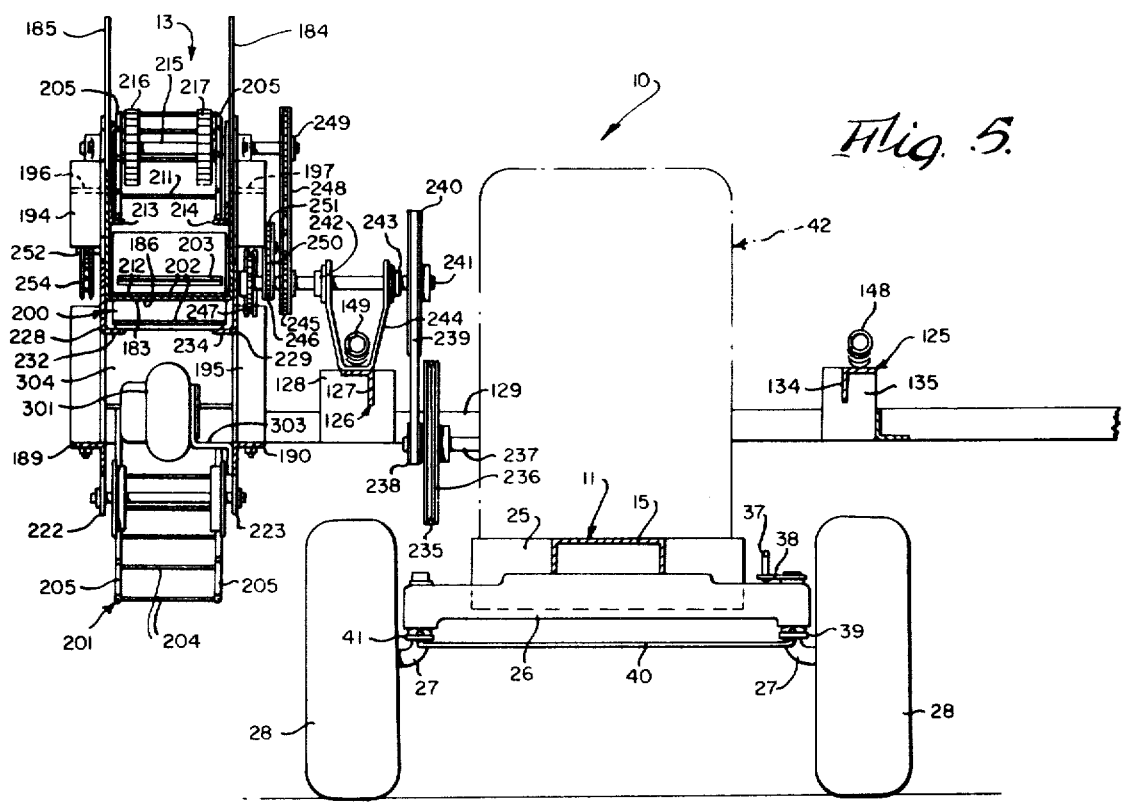
FIG. 5 is a fragmentary cross-sectional view taken along line 5—5 of FIG. 1 with certain parts omitted in the interest of clarity.

Included in conveyor arrangement 13 is a conveyor 182 which receives berries from conveyor belt 166 and transports these berries to a suitable container 14 mounted on the rear of the vehicle. Conveyor 182 includes an upwardly open main channel member 183 which includes sidewalls 184 and 185 and bottom wall 186 (FIGS. 1, 4, 5 and 6). As best can be seen from FIGS. 1, 2 and 6, straps 187 and 188 have their upper ends bolted to plates which are secured as by welding to brace 138. The lower ends of straps 187 and 188 are secured as by welding to sides 185 and 184, respectively, of conveyor channel 183. It is in this manner that the lower front end of the conveyor is supported on the remainder of the vehicle. The upper rear end of channel 183 is supported as follows: Angles 189 and 190 (FIG. 4) have their horizontal legs (FIGS. 4 and 5) bolted to the horizontal legs of angles 129 and 191 (FIG. 3) which are bolted to angles 130 and 131 which are secured to the frame of the vehicle as described in detail above. Extending upwardly from angles 189 and 190 are vertical angles 192 and 193, respectively (FIG. 4) and vertical angles 194 and 195; respectively (FIG. 5). Spanning the tops of vertical angles 192 and 194 is angle 196 (FIG. 1), and spanning the top of angles 195 and 193 is angle 197 (FIG. 2). As can be seen from FIGS. 1, 2, 3, 4 and 5, angles 196 and 197 are welded to sides 185 and 184 of the conveyor and thus support the rear end of the conveyor relative to the vehicle.

The conveyor belt assembly includes an inner belt 200 and an outer belt 201 (see FIG. 11). The inner belt 200 includes a continuous solid web 202 having spaced cleats 203 mounted thereon at intervals so as to prevent the berries which are deposited on the belt from rolling backward as it moves upwardly from the front of the machine toward the rear thereof. Inner conveyor 200 lies entirely within outer conveyor 201 which is of chain link type having spaced transverse bars or rods 204 which are connected to each other at their ends by articulated side edge portions 205. As will become more apparent thereafter, there are open spaces between bars 204 so as to permit the berries which are deposited on the upper run of the chain link conveyor 201 to fall through the spaces between links 204 and come to rest on the upper run of the continuous conveyor 200, but leaves, stalks, and other debris deposited on the chain link conveyor will remain thereon for subsequent disposal when the upper run reaches the end of its travel.

The conveyors 200 and 201 are mounted in the following manner: As can best be seen from FIGS. 1 and 7, a plate 206 is welded to lower end of upstanding side 185 of the main conveyor channel 182. A plate 207 is welded to the lower end of side 184 of the main conveyor channel 182. Journaled between plates 206 and 207 is an idler roller 208 (FIG. 7). Circular plates 209 and 210 maintain both conveyor belts confined thereon, said plates being mounted on the opposite ends of roller 208. FIGS. 7, 6, 5 and 4 are taken on FIG. 1 from the front of the vehicle toward the rear thereof and these figures show the relative positioning of the conveyor belts relative to each other at various longitudinal points along the machine. More specifically, from FIG. 7 it can be seen that the outer belt 201 lies directly on the lower belt 200 and therefore all material deposited on the belt in this area will fall onto the upper run of both belts. As the upper runs of the belts progress from the location shown in FIG. 7 to the location shown in FIG. 6 it can be seen that the upper run 211 of belt 201 is now spaced a distance above the upper run 212 of belt 200. This spacing is effected by virtue of the fact that angles 213 and 214 (FIG. 6 and 3) are welded to the insides of plates 185 and 184, respectively, to guide the upper run 211. It is to be noted that angles 213 and 214 extend substantially throughout the length of plates 184 and 185 and are essentially aimed at sprocket member 215 which essentially includes spaced sprockets 216 and 217 mounted on shaft 218 having the opposite ends thereof journaled in plates 184 and 185. After the upper run of conveyor 201 passes over sprocket member 215, it is guided by spaced plates 219 and 220 which are coplanar with conveyor sides 185 and 184, respectively. Thereafter, conveyor 201 passes over idler pulley 221 which is journaled on a pair of ears 222 and 223 which depend from angles 189 and 190, respectively. Thereafter, the lower run of conveyor 201 passes over idler pulley 224 journaled between angles 189 and 190. Thereafter, conveyor 201 is guided by spaced pairs of angles 225, 226 and 227 which depend downwardly from sides 228 and 229 which are welded to conveyor sides 185 and 184, respectively, and extend for substantially the entire length thereof, as can be seen from FIG. 1. While only both of angles 226 have been shown in FIG. 6, it will be appreciated that there are analogous pairs of angles 225 and 227. It can readily be seen that the stalks and debris are thus carried upwardly beyond drive sprocket 215 and dumped between plates 219 and 220 onto the ground where they serve as mulch.

The upper run of inner conveyor 200, as noted above, rests on the bottom 186 of U-shaped member 182 throughout the length thereof and is guided for longitudinal movement between sides 184 and 185. A driven pulley 230 has its opposite ends journaled between bracket 231 and 232 (FIGS. 1 and 2) which are welded to sides 185 and 184, respectively. After the upper run passes around the pulley 230, the lower runs are guided by horizontal flanges 232 and 234 (FIG. 6) formed at the bottom of plates 228 and 229, respectively, these flanges extending for the entire length of these plates. This guiding is effected so as to cause the lower run of conveyor 200 to be directed toward idler pulley 208.

Conveyors 200 and 201 are driven in the following manner: A power takeoff shaft 233 (FIG. 3) extends outwardly from the vehicle engine housing 42 and mounts a pulley 234 on its outer end which is encircled by belt 235 which in turn encircles pulley 236 keyed to idler shaft 237 (FIG. 5) which also mounts pulley 238, all of the foregoing being mounted in suitable bearings (not shown). The belt 239 encircles pulley 238 and pulley 240 mounted at the end of shaft 241. Shaft 241 is mounted in spaced bearings 242 and 243 carried by U-shaped bracket 244 mounted on the top of angle 126 (FIG. 5). The outer end of shaft 241 mounts sprockets 245, 246 and 247. A chain 248 encircles sprocket 245 and sprocket 249 mounted on shaft 218 to which sprockets 216 and 217 are keyed. This drives the latter two sprockets to drive the chain link conveyor 201. Sprocket 246 is encircled by chain 250 which in turn encircles sprocket 251 mounted on shaft 252 (FIG. 1) which in turn mounts pulley 230. It is in this manner that the inner conveyor 200 is driven. On the outer end of shaft 252 a sprocket 253 is mounted which is encircled by chain 254 which also encircles sprocket 255 mounted on shaft 256 (FIG. 11) extending from gear box 257 which changes the direction of motion and has an output shaft 258 on which pulley 180 is mounted which in turn drives conveyor belt 166 described in detail above which conveys the harvested berries outwardly from reel 12. To support the upper and lower runs of chain 254 from sagging excessively, a bearing channel 259 (FIGS. 1 and 6) is welded to bracket 260 which in turn is welded to strap 187. The lower run of chain 254 crosses idler pulley 261 journaled on stub shaft 262 extending outwardly from the end of strap 187 (FIG. 6).

A cleaning brush 263 is provided for cleaning the spaces between tines 113. Brush 263 extends substantially the entire length of reel 12 and is mounted on an axis which is substantially parallel to the axis of reel 12. More specifically, brush 263 includes a central shaft 264 having the end on the left side of the vehicle mounted in bearings on bracket 265 which is suitably welded to sector 91 and extends upwardly thereof (FIG. 2). The end of shaft 264 on the right side of the vehicle is mounted on bracket 266 having its lower portion welded to ring 93 (FIG. 1). Keyed to shaft 264 is a sprocket 267 which is encircled by chain 268 which is driven by the above mentioned sprocket 247 (FIG. 11). The upper run of chain 268 travels from right to left in FIG. 1 and immediately after leaving sprocket 267 engages idler sprocket 269 (FIGS. 1 and 7) mounted on stub shaft 270 on angle 147. Thereafter chain 268 passes under sprocket 271 (FIGS. 6 and 11) mounted on stub shaft 272 carried by an upstanding arm 273 mounted on plate 69. Thereafter the upper run of chain 268 travels to sprocket 247 (FIG. 11) and the lower run travels from left to right in FIG. 11 and passes underneath idler sprocket 274 (FIGS. 6 and 11) mounted on stub shaft 275 extending from plate 69.

As can be seen from FIG. 11 brush 263 rotates in a counterclockwise direction as shown therein whereas reel 12 rotates in a clockwise direction so that brush 263 throws any debris caught between the tines forwardly for most efficient cleaning and away from the vehicle operator. As can best be seen from FIGS. 1, 2 and 3, the solid conveyor 200 terminates above container 14 and dumps the berries therein whereas the chain link conveyor 201 terminates rearwardly beyond container 14 so as to deposit the debris beyond the vehicle and not into the containers for receiving the berries. Containers 14 are mounted between angles 191 and 129 (FIG. 3) which are welded to angles 277 and 278, respectively, (FIG. 3) which are supported by channel-bar 279 which in turn is rigidly secured, as by welding, to main channel 15, (FIG. 2). Angles 278 and 277 act as tracks for supporting additional containers for carrying harvested berries.

As noted previously, the reel 12 is driven by a chain 82 from the front axle of the machine. Therefore, the reel will Bellville rotate at a predetermined rate of speed which is variable with the speed of the vehicle. It will be appreciated that it is sometimes desirable to drive the vehicle without rotating the reel as in traveling to and from the harvesting area. Accordingly, a highly simplified clutch assembly 280 (FIGS. 3, 6 and 8) is provided. Essentially this clutch includes an outer nut 281 for receiving a wrench, nut 281 forming the head of screw 282 which is received in a suitably tapped bore at the end of axle 23. Washer 283 under the head of nut 281 bears against member 284 which carries a number of circumferentially spaced adjustable screws 285 therein, the heads 286 of which bear against plate 287 which in turn carries clutch facing 288 which bears against sprocket 83 which is rotatably mounted on bushing 292, the other side of which is thrust upon by clutch facing 288 mounted on disc 290 which abuts Bellville washer 291 mounted on bushing 292 keyed to axle 23 by means of key 293. It will readily be appreciated that when screw 282 is loosened, the driving engagement between axle 23 and sprocket 83 is terminated so that the vehicle can be driven without the accompanying rotation of sprocket 83 and reel 12.

As can be seen from FIGS. 1, 2, 3, 12 and 13 a knockdown bar 294 has its opposite ends mounted on struts 295 and 296 which in turn are welded to ring 93 on the right side of the vehicle and channel 72 on the left side of the vehicle. Knockdown bar 294 functions to push over the tall weeds and other vegetation which would interfere with harvesting of the berries.

It will be appreciated that the field in which wild lowbush blueberries grow are many times full of rocks, bumps and the like. Accordingly, impact shoes 297 (FIGS. 1 and 7) are attached as by welding to the bottom of angle brackets 227 on opposite sides of the conveyor and the front end of plate 297 is welded to piate 228 at the front of the conveyor. In the event a high mound or rock is contacted by the front of the conveyor, these shoes will tend to guide the front of the conveyor over such obstructions.

It is also to be noted from FIGS. 2, 7 and 13 that a ground engaging wheel 298 is journaled on a stub shaft 299 which in turn is mounted on a plate 300 attached to channel 72 (FIG. 7). Ground engaging wheel 298 aids in supporting the front end of reel 12 so as to aid in reducing the loading on the remainder of the linkage and for guiding the reel so as to aid in maintaining a space between the ground and the lowermost portion of the reel.

A blower 301 (FIGS. 1 and 5) having a housing with an outlet opening 302 directed rearwardly is mounted on a bracket 303 attached to the vertical leg of angle 190 (FIG. 5). A baffle plate 304 (FIG. 1) has its opposite sides attached between upright angles 194 and 195 for directing a blast of air underneath the lower run of conveyor 200 in the area of pulley 230 so as to blow any chaff away from being deposited into box 14. Blower 301 contains an electric motor which is suitably wired to a source of electric power in the vehicle.

What is claimed is:

1. In a machine for harvesting fruit on relatively low plants such as lowbush blueberries, having a frame movable over the crops in a direction of travel, a reel mounted on said frame for rotation about an axis transverse to said direction of travel and including circumferentially spaced rows of cantilevered tines extending axially along the outer portion of said reel with said tines of each row being spaced from each other a distance which is less than the dimension of the fruit to be harvested, and means for rotating said reel in a direction such that the leading side of said reel descends as said frame moves in said direction of travel, said tines being curved so as to point in the direction of rotation of said reel, the improvement which comprises means for causing said rows of tines to articulate relative to said reel and arranged to move said tines toward a more open position prior to engaging the fruit so as to enter the plants with relatively little disruption and to move said tines to a more closed position at the bottom of said reel to retain the fruit thereon and to move said tines to a more open position as said tines move upwardly to prevent premature deposit of the fruit into the reel and to move said tines to a more closed position during upward travel of said tines for facilitating the dropping of the fruit into said reel.

2. A machine for harvesting fruit as set forth in claim 1 including brush means mounted proximate said tines for cleaning said tines when said tines are in a more closed position prior to opening for engaging said crop.

3. A machine for harvesting fruit as set forth in claim 1 wherein said means for articulating said tines comprise a cam track mounted proximate said reel and cam follower means attached to said tines.

4. In a machine for harvesting fruit on relatively low plants such as lowbush blueberries, having a frame movable over the crops in a direction of travel, a reel mounted on said frame for rotation about an axis transverse to said direction of travel and including circumferentially spaced rows of cantilevered tines extending axially along the outer portion of said reel with said tines of each row being spaced from each other a distance which is less than the dimension of the fruit to be harvested, the improvement which comprises means for floatingly mounting said reel including first and second links having first portions attached to opposite ends of said reel and second portions pivotally mounted relative to said vehicle frame, and spring means mounted on said frame and effectively supporting said first and second links.

5. A machine for harvesting fruit as set forth in claim 4 wherein said second portions are mounted on front axles of said machine, and drive means coupling said axle and said reel for causing said reel to rotate at a rate which is related to the speed of said vehicle.

6. A machine for harvesting fruit as set forth in claim 4 including conveyor means within said reel and extending longitudinally thereof, said conveyor means including an inner end within said reel and an outer end extending out of an open end of said reel, first means for attaching said inner end of said conveyor means to said reel, and second means for fixedly attaching said outer end of said conveyor means relative to the frame of said vehicle, said first means including a movable connection to permit said inner end of said conveyor means to move relative to said reel during floating action of said reel.

7. A machine for harvesting fruit as set forth in claim 6 including second conveyor means extending longitudinally of said machine and inclined upwardly toward the rear of said machine for receiving said crop from said first conveyor means and conveying said crop toward the rear of said machine.

8. A machine for harvesting fruit as set forth in claim 7 wherein said second conveyor means includes a continuous solid belt mounted within an open belt whereby said crop drops through said open belt onto said solid belt and whereby debris is retained on said open belt.

9. A machine for harvesting fruit as set forth in claim 8 wherein said open belt extends more rearwardly to said vehicle than said solid belt to discard said debris rearwardly of said machine.

10. A machine for harvesting fruit as set forth in claim 9 including fan means mounted proximate the rear end of said solid belt for blowing debris away from the crop which is leaving said solid belt.

11. A machine for harvesting fruit as set forth in claim 5 including clutch means for selectively disengaging the drive to said reel means.

12. A machine for harvesting fruit as set forth in claim 4 wherein said vehicle includes front wheels proximate said reel, rear wheels and steering linkage means coupled to said rear wheels.

* * * * *

PO-1050
(5/69)

UNITED STATES PATENT OFFICE
CERTIFICATE OF CORRECTION

Patent No. 3,648,447    Dated    March 14, 1972

Inventor(s)    Charles G. Burton

It is certified that error appears in the above-identified patent and that said Letters Patent are hereby corrected as shown below:

Column 1, line 38, "capacity" should read --capability--.

Column 5, line 17, "the" should read --they--.

Column 7, line 14, after "of" insert --the--.

Column 8, line 46, "is" should read --its--.

Column 10, line 58, "to" should read --on--.

Signed and sealed this 29th day of August 1972.

(SEAL)
Attest:

EDWARD M. FLETCHER, JR.
Attesting Officer

ROBERT GOTTSCHALK
Commissioner of Patents